US009620043B2

(12) United States Patent
Jung

(10) Patent No.: US 9,620,043 B2
(45) Date of Patent: Apr. 11, 2017

(54) METHOD AND APPARATUS FOR DRIVING THREE-DIMENSIONAL (3D) DISPLAY DEVICE, 3D DISPLAY DEVICE, 3D GLASSES, 3D DISPLAY SYSTEM, COMPUTER PROGRAM AND NON-TRANSIENT STORAGE MEDIUM

(71) Applicant: BOE TECHNOLOGY GROUP CO., LTD., Beijing (CN)

(72) Inventor: Chulgyu Jung, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 281 days.

(21) Appl. No.: 14/382,892

(22) PCT Filed: Dec. 16, 2013

(86) PCT No.: PCT/CN2013/089574
§ 371 (c)(1),
(2) Date: Sep. 4, 2014

(87) PCT Pub. No.: WO2015/027627
PCT Pub. Date: Mar. 5, 2015

(65) Prior Publication Data
US 2016/0247425 A1   Aug. 25, 2016

(30) Foreign Application Priority Data

Aug. 30, 2013  (CN) .......................... 2013 1 0388874

(51) Int. Cl.
*G09G 3/00*       (2006.01)
*G02B 27/22*      (2006.01)
(Continued)

(52) U.S. Cl.
CPC ............. *G09G 3/003* (2013.01); *G02B 27/22* (2013.01); *G09G 3/2007* (2013.01);
(Continued)

(58) Field of Classification Search
CPC ................. G09G 3/003; G09G 3/2007; G09G 2320/0686; H04N 13/044
See application file for complete search history.

(56) References Cited

U.S. PATENT DOCUMENTS

2011/0310090 A1* 12/2011 Kim .................... G02B 27/2264
                                                        345/419
2012/0056856 A1    3/2012 Woo et al.

FOREIGN PATENT DOCUMENTS

CN    102045583    5/2011
CN    102122075    7/2011
(Continued)

OTHER PUBLICATIONS

Office Action in Chinese Patent Application No. 201310388874.4, dated Sep. 11, 2015.
(Continued)

*Primary Examiner* — Sahlu Okebato
(74) *Attorney, Agent, or Firm* — Scarinci Hollenbeck

(57) ABSTRACT

A method for driving a three-dimensional (3D) display device according to this disclosure may include: determining a first 3D image to be displayed currently; and displaying a first partial image of the first 3D image during a first period, and displaying a second partial image of the first 3D image during a second period, so as to display the first 3D image completely. And there is a difference between display brightness of the first partial image and display brightness of the second partial image.

20 Claims, 4 Drawing Sheets

(51) Int. Cl.
*H04N 13/04* (2006.01)
*G09G 3/20* (2006.01)

(52) U.S. Cl.
CPC ..... *H04N 13/0438* (2013.01); *H04N 13/0497* (2013.01); *G09G 2320/0686* (2013.01); *H04N 13/044* (2013.01)

(56) References Cited

FOREIGN PATENT DOCUMENTS

| | | |
|---|---|---|
| CN | 102149002 | 8/2011 |
| CN | 102740090 | 10/2012 |
| CN | 102822886 | 12/2012 |
| CN | 102893323 | 1/2013 |
| CN | 103327350 | 9/2013 |
| CN | 103439798 | 12/2013 |
| JP | 2013031063 | 2/2013 |

OTHER PUBLICATIONS

Office Action issued in corresponding Chinese Application No. 201310388744 dated Mar. 20, 2015.
International Search Report and Written Opinion issued in International Application No. PCT/CN2013/089574 dated Mar. 30, 2013.

* cited by examiner

-Prior Art-

METHOD AND APPARATUS FOR DRIVING THREE-DIMENSIONAL (3D) DISPLAY DEVICE, 3D DISPLAY DEVICE, 3D GLASSES, 3D DISPLAY SYSTEM, COMPUTER PROGRAM AND NON-TRANSIENT STORAGE MEDIUM

CROSS-REFERENCE TO RELATED APPLICATION

This application is the U.S. national phase of PCT Application No. PCT/CN2013/089574 filed on Dec. 16, 2013, which claims priority to Chinese Patent Application No. 201310388874.4 filed on Aug. 30, 2013, the disclosures of which are incorporated in their entirety by reference herein.

TECHNICAL FIELD

The present disclosure relates to the field of display technology, and in particular to a method and an apparatus for driving a three-dimensional (3D) display device, a 3D display device, a 3D glasses, a 3D display system, a computer program and a non-transient storage medium.

BACKGROUND

In cooperation with a shutter-type three-dimensional (3D) glasses, a 3D display device enables a user to view a 3D image.

Specifically, in a case that a left-eye image is displayed on the display device, a left lens of the 3D glasses is in an ON state, and a right lens thereof is in an OFF state; and in a case that a right-eye image is displayed on the display device, the right lens of the 3D glasses is in the ON state, and the left lens thereof is in the OFF state. By means of a turn-on operation and a turn-off operation of the left lens and the right lens alternately and repeatedly, a viewer can view a 3D image with stereoscopic experience based on alternate visual fields and visual continuity effect.

Presently, in order to display a 3D image, a Liquid Crystal Display (LCD) or an Organic Light Emitting Diode (OLED) device needs to have a higher driving frequency, such as 120 Hz, 240 Hz, 480 Hz, and so forth.

By taking a sequence diagram of driving a 3D glasses as shown in FIG. 1 as an example, in a case that a 3D image is displayed on a display device with a driving frequency of 120 Hz, an actual driving frequency for displaying an image is approximately above 150 Hz. Thus the image is displayed on the display device in an order of: L1→R1→L2→R2 (where L represents the left-eye image, and R represents the right-eye image), and turn-on periods of the left lens and the right lens are illustrated in FIG. 1, which are approximately 30% of $\frac{1}{150}$ second.

The period during which a viewer can view the 3D image is relatively short actually, thus the viewer feels that the gray scale of the 3D image is lowered, and the viewing experience of the viewer is degraded.

SUMMARY

Technical Problems to be Solved

It is provided a method and an apparatus for driving a three-dimensional (3D) display device, a 3D display device, a 3D glasses, a 3D display system, a computer program and a non-transient storage medium, for improving imaging quality of a 3D image, and improving viewing experience of a viewer.

Technical Solutions

Technical solutions as follows are provided in an embodiment of the present disclosure.

It is provided a method for driving a three-dimensional (3D) display device in an embodiment of the present disclosure, which includes:
  determining a first 3D image to be displayed currently; and
  displaying a first partial image of the first 3D image during a first period, and displaying a second partial image of the first 3D image during a second period, so as to display the first 3D image completely, wherein there is a difference between display brightness of the first partial image and display brightness of the second partial image.
Alternatively, the method may further include:
  determining a first preset condition based on a display parameter for the first 3D image and a second 3D image that are displayed continuously, wherein in a case that the difference meets the first preset condition, a cross-talk index between the first 3D image and the second 3D image is smaller than a preset value.
Alternatively, the first 3D image may be a left-eye image in a 3D image, and the second 3D image may be a right-eye image in the 3D image; or
  the first 3D image may be a right-eye image in a 3D image, and the second 3D image may be a left-eye image in the 3D image.
Alternatively, the display brightness of the first partial image may be substantially greater than the display brightness of the second partial image.
Alternatively, a length of the first period and/or the second period may be equal to a length of one data frame display period.
Alternatively, a length of the first period and/or the second period may be shorter than a length of one data frame display period.
Alternatively, a period during which the first 3D image is displayed completely by the 3D display device may be equal to a turn-on period of a lens of a 3D glasses corresponding to the 3D display device.
Alternatively, the method may further include:
  adjusting gray scale voltages of pixel units to achieve the difference between the display brightness of the first partial image and the display brightness of the second partial image.
Alternatively, the displaying a first partial image of the first 3D image during a first period may include:
  driving pixel units in a first pixel unit set to display the first partial image, and driving pixel units in a second pixel unit set to display a dark-tone primary color or controlling the pixel units in the second pixel unit set not to display an image, during the first period;
the displaying a second partial image of the first 3D image during a second period may include:
  driving pixel units in a first pixel unit set to display a dark-tone primary color or controlling the pixel units in the first pixel unit set not to display an image, and driving pixel units in a second pixel unit set to display the second partial image, during the second period.

Alternatively, the pixel units in the first pixel unit set and the pixel units in the second pixel unit set may be arranged alternately in a transverse direction and/or a longitudinal direction.

It is further provided an apparatus for driving a three-dimensional (3D) display device in an embodiment of the present disclosure, wherein the apparatus includes:

a determination module configured to determine a first 3D image to be displayed currently; and a display module configured to display a first partial image of the first 3D image during a first period and display a second partial image of the first 3D image during a second period, so as to display the first 3D image completely, wherein there is a difference between display brightness of the first partial image and display brightness of the second partial image.

Alternatively, the apparatus may further include:

a setting module configured to determine a first preset condition based on a display parameter for the first 3D image and a second 3D image that are displayed continuously, wherein in a case that the difference meets the first preset condition, a crosstalk index between the first 3D image and the second 3D image is smaller than a preset value.

Alternatively, the display brightness of the first partial image may be greater than the display brightness of the second partial image.

Alternatively, the apparatus may further include: an adjustment module configured to adjust gray scale voltages of pixel units to achieve the difference between the display brightness of the first partial image and the display brightness of the second partial image.

Alternatively, the display module may include a first pixel unit set and a second pixel unit set.

Alternatively, the pixel units in the first pixel unit set and the pixel units in the second pixel unit set may be arranged alternately in a transverse direction and/or a longitudinal direction.

It is further provided a three-dimensional (3D) display device in an embodiment of the present disclosure, which includes the above apparatus for driving the 3D display device according to the embodiment of the present disclosure.

It is further provided a three-dimensional (3D) glasses in an embodiment of the present disclosure, which is configured to display a 3D image in cooperation with the above 3D display device according to the embodiment of the present disclosure.

It is further provided a three-dimensional (3D) display system in an embodiment of the present disclosure, which includes the above 3D display device and the above 3D glasses.

It is further provided a computer program in an embodiment of the present disclosure, when executed by a processor, which is configured to implement the above method for driving the 3D display device.

It is further provided a non-transient storage medium in an embodiment of the present disclosure, on which the above computer program is stored.

Benefit Effects

It can be seen from above that it is provided a method and an apparatus for driving a 3D display device, a 3D display device, a 3D glasses, a 3D display system, a computer program and a non-transient storage medium in the disclosure. A first 3D image to be displayed currently is determined; and a first partial image of the first 3D image is displayed during a first period, and a second partial image of the first 3D image is displayed during a second period, so as to display the first 3D image completely, wherein there is a difference between display brightness of the first partial image and display brightness of the second partial image. Thereby a viewing period of the 3D image is lengthened, and visual experience of a viewer for a 3D image is improved.

DETAILED DESCRIPTION

Embodiments of the present disclosure are further described in conjunction with the drawings and examples hereinafter. The following examples are only for describing the present disclosure, and not meant to limit the scope of the present disclosure.

To make the objects, solutions and advantages of the present disclosure more obvious, technical solutions of the embodiments of the present disclosure will be illustrated in detail in the following in conjunction with the drawings of the embodiments. Apparently, the described embodiments are only some but not all of the embodiments of the present disclosure. All the other embodiments obtained by those skilled in the art based on the described embodiments of the present disclosure fall within the scope of protection of the present disclosure.

Technical terms or scientific terms used here should have a common meanings understood by those ordinary skilled in the art. Words such as "first" and "second" used in the specification and the claims of this patent application do not indicate any order, quantity or importance, and are only used to distinguish different components, unless defined otherwise. Similarly, words such as "one" and "a/an" do not indicate any numeral limitation either, but at least one existing. Words such as "connected to" or "connected with" do not limited to physical or mechanical connection necessarily, but can include electrical connection, either direct or indirect. Words such as "upper", "lower", "left" and "right" only used to indicate the relative position relation, and if the absolute position of the described object changes, the relative position relation changes accordingly.

Figure 1:
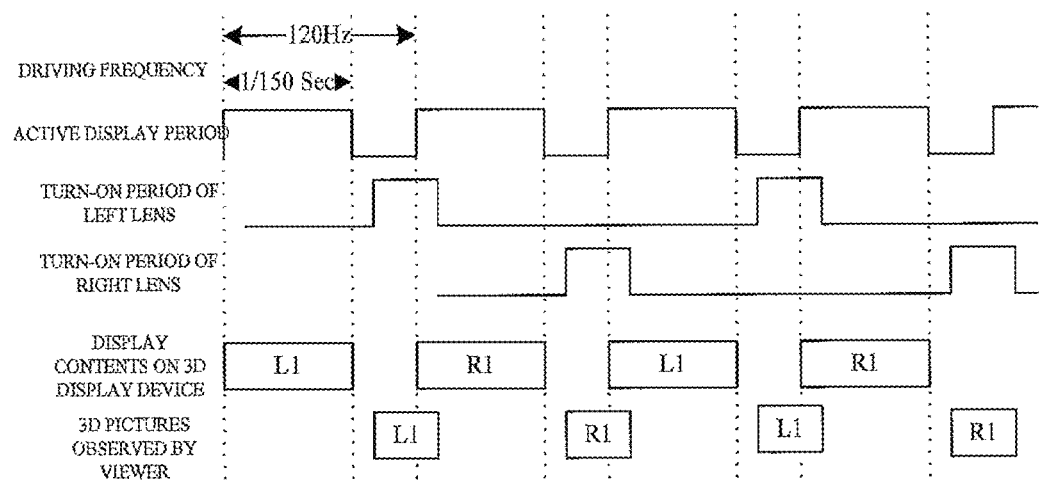
FIG. 1 is a sequence diagram of driving a 3D glasses in the prior art.
Figure 2:
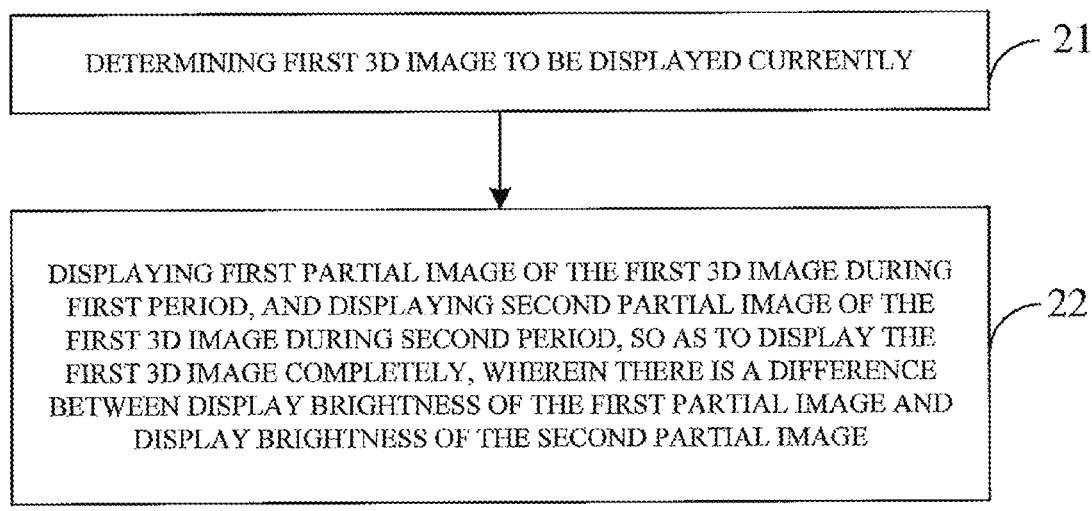
FIG. 2 is a schematic flow chart of a method for driving a three-dimensional (3D) display device according to an embodiment of the present disclosure.

It is provided a method for driving a three-dimensional (3D) display device in an embodiment of the present disclosure, as shown in FIG. 2, and the method may include:

step 21: determining a first 3D image to be displayed currently; and step 22: displaying a first partial image of the first 3D image during a first period, and displaying a second partial image of the first 3D image during a second period, so as to display the first 3D image completely, wherein there is a difference between display brightness of the first partial image and display brightness of the second partial image.

A viewer is sensitive to the change in the brightness difference between images. For example, in a case that there are more bright images on the display screen than dark images, more attentions will be paid on the dark images than the bright image; and in a case that there are more dark images on the display screen than bright image, more attentions will be paid on the bright images than the dark images. Thus, in the method for driving the 3D display device according to an embodiment of the present disclosure, by reducing the brightness, i.e., the gray scale, of a part of the 3D image, the visual feeling of the viewer for the 3D image with greater display brightness is more distinct and intense when the viewed image is switched between the left-eye image and the right-eye image in the 3D image, thereby the visual feeling of the viewer for the 3D image is improved.

In the method according to an embodiment of the present disclosure, there is a difference between the display brightness of the left-eye image and the right-eye image in the 3D image, when the viewed image is switched between the left-eye image and the right-eye image, and the crosstalk due to the overlap between the left-eye image and the right-eye image can be minimized. In order to avoid the crosstalk between the left-eye image and the right-eye image further, in an embodiment of the present disclosure, a first preset condition may be determined based on a display parameter for the first 3D image and the second 3D image that are displayed continuously, so that in a case that the difference between the display brightness of the first partial image and the display brightness of the second partial image meets the first preset condition, a crosstalk index between the first 3D image and the second 3D image is smaller than a preset value (for example, zero).

In an embodiment of the present disclosure, the first 3D image may be a left-eye image in a 3D image, and the second 3D image may be a right-eye image in the 3D image; or the first 3D image may be a right-eye image in a 3D image, and the second 3D image may be a left-eye image in the 3D image.

That is to say, in an embodiment of the present disclosure, it is only necessary to ensure that there is a period of time for the switching between the left-eye image and the right-eye image, during which a part of the 3D image is displayed with lower brightness.

In an embodiment of the present disclosure, with the method for driving the 3D display device according to the embodiment of the present disclosure, the display brightness of the first partial image of the first 3D image may be greater than the display brightness of the second partial image of the first 3D image.

By way of example, in order to display the left-eye image, a first partial image of the left-eye image may be displayed with a first brightness which is a normal display brightness, then a second partial image of the left-eye image may be displayed with a second brightness smaller than the first brightness. Next, a first partial image of the right-eye image may be displayed with the first brightness which is the normal display brightness, and then a second partial image of the right-eye image may be displayed with the second brightness smaller than the first brightness. The following 3D images may be displayed sequentially with the first brightness and the second brightness which are different.

In an embodiment of the present disclosure, the preset value of the crosstalk index represents the crosstalk condition between the left-eye image and the right-eye image in the 3D image. If there is no crosstalk between the left-eye image and the right-eye image, the preset value is zero, and if there is serious crosstalk between the left-eye image and the right-eye image, the preset value is a value greater than zero, such as 4 or 5.

In an embodiment of the present disclosure, the display parameter for constructing the first preset condition may include display parameters related to the display brightness, such as the gray scale value and Gamma level.

In an embodiment of the present disclosure, a length of the first period T1 and the second period T2 in the embodiment of the present disclosure may be equal to a length of one data frame display period.

Figure 3:
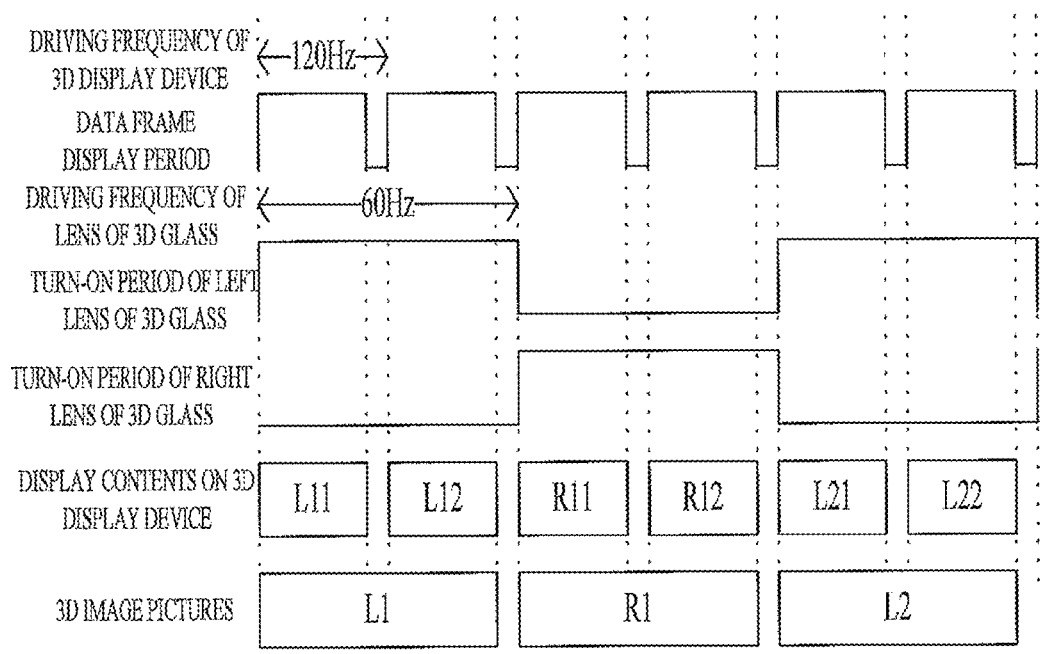
FIG. 3 is a first schematic diagram of an implementation procedure of a method for driving a 3D display device according to an embodiment of the present disclosure.

As shown in FIG. 3, the data frame display period in an embodiment of the present disclosure may be determined based on the driving frequency of the 3D display device. For example, if the driving frequency of the 3D display device is 120 Hz, the display time for each data frame is about $1/120$ second (Sec).

It is to be noted that the data frame display period in an embodiment of the present disclosure includes the active timing of the pixel unit (i.e., a period during which the pixel unit displays the image actually), and an inactive timing which is very short and can be omitted.

In an embodiment of the present disclosure, the pixel units in the 3D display device may be driven to display the first partial image L11 of the left-eye image L1 with the first brightness during the first data frame display period (such as $1/120$ second), and then display the second partial image L12 of the left-eye image L1 with the second brightness during the second data frame display period, wherein the second brightness is lower than the first brightness. Thereby the first partial image L11 of the left-eye image displayed with the first brightness is enhanced for the viewer. Subsequently, the first partial image R11 of the right-eye image R1 may be displayed with the first brightness during the first data frame display period, and then the second partial image R12 of the right-eye image R1 may be displayed with the second brightness during the second data frame display period. And then the following display processes of the left-eye image and the right-eye image (L2, R2 and so forth) may be repeated, so that the viewer can observe the whole 3D images clearly and completely.

In another embodiment of the present disclosure, the first partial image such as L21 of the left-eye image may be displayed with the second brightness during the first data frame display period, and then the second partial image such as L22 of the left-eye image may be displayed with the first brightness during the second data frame display period. Alike, the second brightness is lower than the first brightness. Then the first partial image such as R21 of the right-eye image may be displayed with the second brightness during the first data frame display period, and the second partial image R22 of the right-eye image may be displayed with the first brightness during the second data frame display period.

That is to say, in an embodiment of the present disclosure, the display sequence of the 3D image with the reduced brightness can be configured flexibly. Moreover, in an embodiment of the present disclosure, the first partial image and the second partial image in the 3D image may be the same or not.

In another embodiment of the present disclosure, the length of one of the first period and the second period for displaying different parts of a 3D image according to the embodiment of the present disclosure may be shorter than the length of one data frame display period, and the length of another one (for example, the second period corresponding to the first period as well as the first period corresponding to the second period) may be greater than the length of one data frame display period.

Generally, the 3D display device cooperates with a 3D glasses, such as a shutter-type 3D glasses, to achieve the 3D images. In an embodiment of the present disclosure, in a period during which a complete 3D image such as the left-eye image or the right-eye image is displayed by the 3D display device, the left-eye shutter or the right-eye shutter of the 3D glasses is always in the ON state, so as to ensure the complete display of the 3D images. That is to say, in an embodiment of the present disclosure, a period during which the first 3D image is displayed completely by the 3D display device may be equal to a turn-on period of a lens of a 3D glasses corresponding to the 3D display device.

The human brain has a transient storage feature for the images. Through the alternation of the left-eye images and the right-eye images, the 3D images may be composed in the brain of the viewer, so that the viewer can observe the 3D images with stereoscopic experience.

As can be seen from the embodiment shown in FIG. 3, the turn-on period (On Time) of a lens of the 3D glasses is equal to a sum of the first period and the second period, and if the driving frequency of the 3D display device is 120 Hz, the turn-on period of the shutter lens of the 3D glasses in an embodiment of the present disclosure may be two times of $1/120$ second, which is about $1/60$ second, i.e., 60 Hz. Then the actual driving frequency of the 3D glasses may be 30 Hz.

It can be seen that with the method for driving the 3D display device according to the embodiment of the present disclosure, the turn-on period of the lens of the 3D glasses can be lengthened significantly (by taking the driving frequency of 60 Hz as an example, the turn-on period of the lens can be maintained as 16.7 millisecond). As compared with the conventional 3D glasses with the driving frequency of 120 Hz (the turn-on period of which is about 2.5 millisecond), the turn-on period of the lens of the 3D glasses according to the embodiment of the present disclosure is more than 6 times longer, thus the display effect and quality of the 3D image are improved significantly, and the experience of the viewer for the 3D image is improved further.

In the prior art, as the driving frequency of the display device is increased, the driving frequency of the 3D glasses is increased, and then the power consumption of the 3D glasses is increased, so that the use time of the 3D glasses powered by a battery and the like is reduced. Due to the increasing of the power, the 3D glasses are subject to the problem of Electro-Magnetic Interference (EMI).

With the method for driving the 3D display device according to the embodiment of the present disclosure, not only the turn-on period of the lens of the 3D glasses can be lengthened, but also the driving frequency of the 3D glasses can be reduced significantly without changing the driving frequency of the 3D display device. By taking the above 30 Hz as an example, as compared with the conventional 3D glasses with the driving frequency of 120 Hz, the driving frequency of the 3D glasses can be reduced as ¼ of that of the conventional 3D glasses by using the method according to the embodiment of the present disclosure. Thus the power consumption of the 3D glasses is reduced, the use time of the 3D glasses is lengthened, and the EMI is improved effectively.

In an embodiment of the present disclosure, gray scale voltages of pixel units may be adjusted, so as to achieve the difference between the display brightness of the first partial image and the display brightness of the second partial image. The adjustment of the gray scale voltages may be implemented based on a well-known conventional art.

In an embodiment, the pixel unit in the 3D display device according to the embodiment of the present disclosure may be classified into a first pixel unit set and a second pixel unit set, for displaying the corresponding partial image of the 3D image during a display period (for example, the first period or the second period).

The pixel units included in the first pixel unit set and the second pixel unit set (i.e., all the pixel units in the 3D display device) may be driven at the same time to display a partial image of the 3D image with the first brightness (i.e., the normal brightness). The pixel units included in one of the first pixel unit set and the second pixel unit set may be driven to display another partial image of the 3D image with the second brightness lower than the first brightness (or other brightness lower than the first brightness), and the pixel units included in the other one of the first pixel unit set and the second pixel unit set may be driven to display the another partial image of the 3D image with the other brightness smaller than the first brightness, so that the second brightness of the 3D display device is smaller than the first brightness as a whole.

Figure 4:
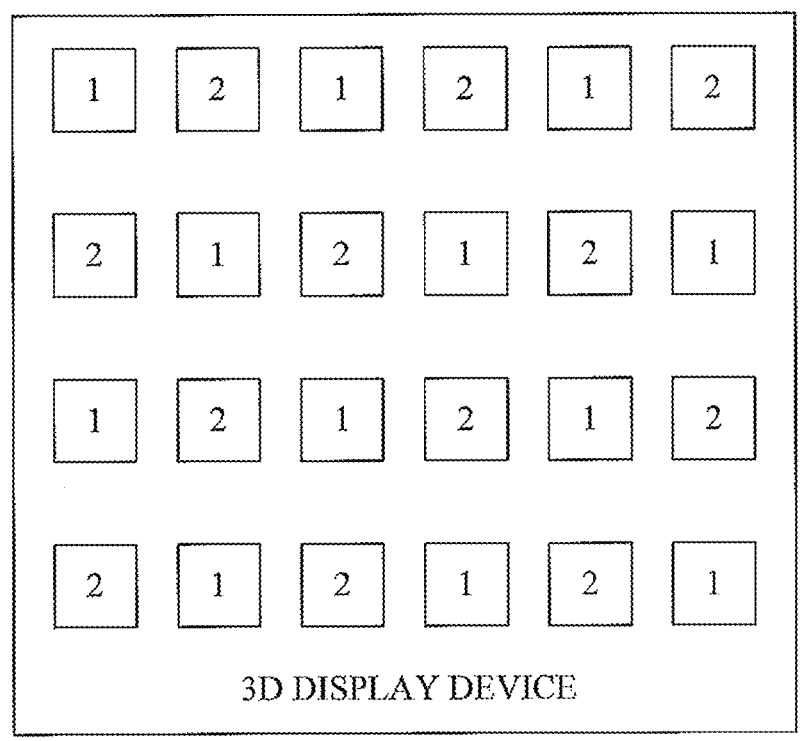
FIG. 4 is a schematic diagram of an arrangement relation between a first pixel unit set and a second pixel unit set according to an embodiment of the present disclosure.

In an alternative embodiment, as shown in FIG. 4, the pixel units in the first pixel unit set and the pixel units in the second pixel unit set may be arranged alternately in a transverse direction and/or a longitudinal direction. In FIG. 4, the pixel unit with the indication of 1 may belong to the first pixel unit set, and the pixel unit with the indication of 2 may belong to the second pixel unit set.

Alternatively, the pixel units in the first pixel unit set and the pixel units in the second pixel unit set may be arranged alternately only in the transverse direction or the longitudinal direction.

Alternatively, the first pixel unit set and the second pixel unit set may be arranged in the transverse direction or the longitudinal direction as a whole.

In an embodiment of the present disclosure, in order that different partial images of the same 3D image have different display brightness, the pixel units in the first pixel unit set or the second pixel unit set are driven to display the dark-tone primary color, or the pixel units in the first pixel unit set or the second pixel unit set are controlled not to display image.

Examples

Figure 5:
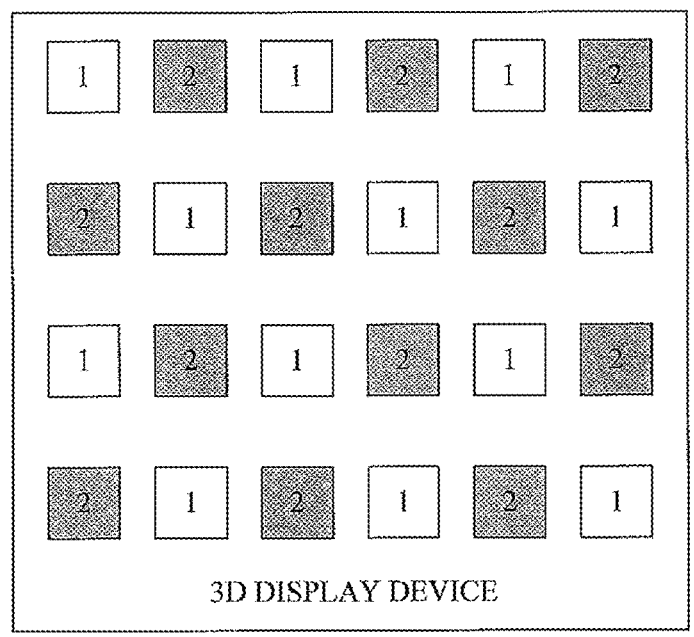
FIG. 5 is a second schematic diagram of an implementation procedure of a method for driving a 3D display device according to an embodiment of the present disclosure.

For example, during the first period, the pixel units in the first pixel unit set may be driven to display the first partial image with the normal brightness, and the pixel units in the second pixel unit set may be driven to display the dark-tone primary color or controlled not to display image, as shown in FIG. 5. In FIG. 5, the shadow shown in the box (representing pixel units) indicated as 2 is used to indicate that the pixel units in the second pixel unit set display the dark-tone primary color or do not display image.

Figure 6:
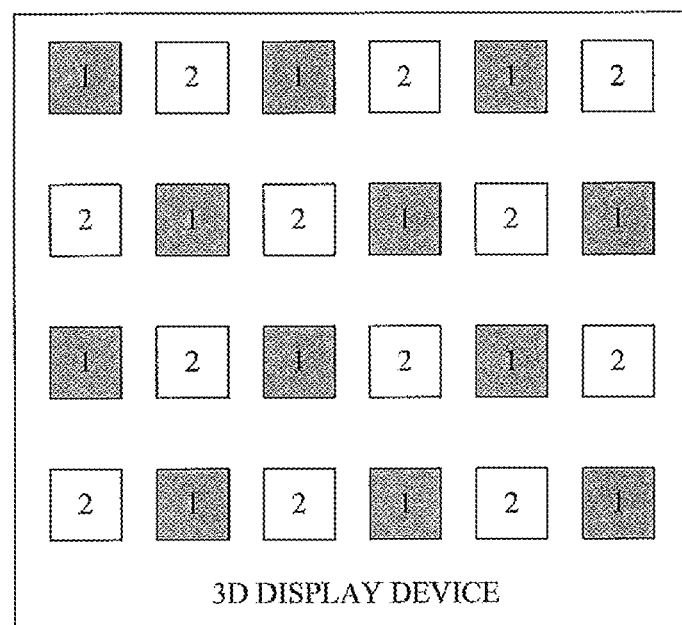
FIG. 6 is a third schematic diagram of an implementation procedure of a method for driving a 3D display device according to an embodiment of the present disclosure.

For example, during the second period, the pixel units in the first pixel unit set may be driven to display the dark-tone primary color or controlled not to display image, and the pixel units in the second pixel unit set may be driven to display the second partial image with the normal brightness, as shown in FIG. 6.

In this embodiment, with the method for driving the 3D display device according to the embodiment of the present disclosure, the pixel units in different pixel unit sets are driven during different time periods to display the corresponding partial images of the left-eye image and the right-eye image of the 3D image with different brightness alternately, the visual experience of the viewer for the 3D image is enhanced.

Figure 7:
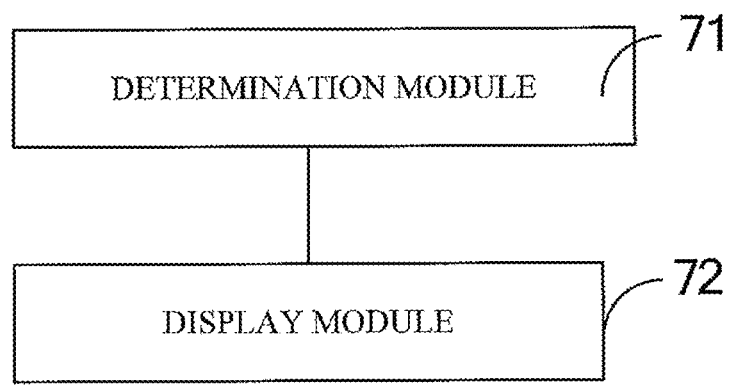
FIG. 7 is a schematic structural diagram of a 3D display device according to an embodiment of the present disclosure.

It is further provided an apparatus for driving a 3D display device in an embodiment of the present disclosure, as shown in FIG. 7, and the apparatus includes:

a determination module 71 configured to determine a first 3D image to be displayed currently; and a display module 72 configured to display a first partial image of the first 3D image during a first period and display a second partial image of the first 3D image during a second period, so as to display the first 3D image completely, wherein there is a difference between display brightness of the first partial image and display brightness of the second partial image.

In a preferred embodiment, the apparatus may further include:

a setting module configured to determine a first preset condition based on a display parameter for the first 3D image and a second 3D image that are displayed continuously, wherein in a case that the difference meets the first preset condition, a crosstalk index between the first 3D image and the second 3D image is smaller than a preset value.

In a preferred embodiment, the apparatus may further include:

an adjustment module configured to adjust gray scale voltages of pixel units to achieve the difference between the display brightness of the first partial image and the display brightness of the second partial image.

In a preferred embodiment, the display module 72 may include a first pixel unit set and a second pixel unit set.

And the pixel units in the first pixel unit set and the pixel units in the second pixel unit set may be arranged alternately in a transverse direction and/or a longitudinal direction.

As to the implementation process for the apparatus for driving the 3D display device according to the embodiment of the present disclosure, reference may be made to the related description of the method for driving the 3D display device according to the embodiment of the present disclosure, which is not described in detail here.

It is further provided a 3D display device in an embodiment of the present disclosure, which may include the above apparatus for driving the 3D display device according to the embodiment of the present disclosure.

It is further provided a 3D glasses in an embodiment of the present disclosure, which is configured to display a 3D image in cooperation with the above 3D display device according to the embodiment of the present disclosure.

It is further provided a 3D display system in an embodiment of the present disclosure, which includes the above 3D display device and the above 3D glasses.

It is further provided a computer program in an embodiment of the present disclosure, which is configured to implement the above method for driving the 3D display device when called and executed by a processor and run on a computer.

It is further provided a non-transient storage medium in an embodiment of the present disclosure, on which the above computer program is stored.

It can be seen from above that it is provided a method and an apparatus for driving a 3D display device, a 3D display device, a 3D glasses, a 3D display system, a computer program and a non-transient storage medium in the disclosure. A first 3D image to be displayed currently is determined; and a first partial image of the first 3D image is displayed during a first period, and a second partial image of the first 3D image is displayed during a second period, so as to display the first 3D image completely, wherein there is a difference between display brightness of the first partial image and display brightness of the second partial image. Thereby visual experience of a viewer for a 3D image is improved.

The above are only embodiments of the present disclosure. It should be noted that several modifications and replacement may be made by those skilled in the art without deviating from the principle of the present disclosure, and those modifications and replacement should also be deemed as within the scope of protection of the present disclosure.

The above embodiments are only for describing the present disclosure, but not limiting the present disclosure. Various changes and variations may be made by those skilled in the art without deviating from the spirit and scope of the present disclosure. Therefore all the equivalent technical solutions fall within the scope of the protection of the present disclosure.

What is claimed is:

1. A method for driving a three-dimensional (3D) display device, comprising:

determining a first 3D image to be displayed currently; and displaying a first partial image of the first 3D image during a first period, displaying a second partial image of the first 3D image during a second period, so as to display the first 3D image completely, wherein there is a difference between display brightness of the first partial image and display brightness of the second partial image, and wherein the first 3D image is a left-eye image or a right-eye image within a 3D image.

2. The method according to claim 1, further comprising:

determining a first preset condition based on a display parameter for the first 3D image and a second 3D image that are displayed continuously, wherein in a case that the difference meets the first preset condition, a crosstalk index between the first 3D image and the second 3D image is smaller than a preset value.

3. The method according to claim 2, wherein the first 3D image is a left-eye image in a 3D image, and the second 3D image is a right-eye image in the 3D image; or the first 3D image is a right-eye image in a 3D image, and the second 3D image is a left-eye image in the 3D image.

4. The method according to claim 1, wherein the display brightness of the first partial image is substantially greater than the display brightness of the second partial image.

5. The method according to claim 1, wherein a length of the first period and/or the second period is shorter than or equal to a length of one data frame display period.

6. The method according to claim 1, wherein a period during which the first 3D image is displayed completely by the 3D display device is equal to a turn-on period of a lens of a 3D glasses corresponding to the 3D display device.

7. The method according to claim 1, further comprising:
adjusting gray scale voltages of pixel units to achieve the difference between the display brightness of the first partial image and the display brightness of the second partial image.

8. The method according to claim 1, wherein the displaying a first partial image of the first 3D image during a first period comprises:
driving pixel units in a first pixel unit set to display the first partial image, and driving pixel units in a second pixel unit set to display a dark-tone primary color or controlling the pixel units in the second pixel unit set not to display an image, during the first period;
the displaying a second partial image of the first 3D image during a second period comprises:
driving pixel units in a first pixel unit set to display a dark-tone primary color or controlling the pixel units in the first pixel unit set not to display an image, and driving pixel units in a second pixel unit set to display the second partial image, during the second period.

9. The method according to claim 8, wherein the pixel units in the first pixel unit set and the pixel units in the second pixel unit set are arranged alternately in a transverse direction and/or a longitudinal direction.

10. An apparatus for driving a three-dimensional (3D) display device, comprising:
a determination module configured to determine a first 3D image to be displayed currently; and
a display module configured to display a first partial image of the first 3D image during a first period and display a second partial image of the first 3D image during a second period, so as to display the first 3D image completely, wherein there is a difference between display brightness of the first partial image and display brightness of the second partial image,
wherein the first 3D image is a left-eye image or a right-eye image within a 3D image.

11. The apparatus according to claim 10, further comprising:
a setting module configured to determine a first preset condition based on a display parameter for the first 3D image and a second 3D image that are displayed continuously, wherein in a case that the difference meets the first preset condition, a crosstalk index between the first 3D image and the second 3D image is smaller than a preset value.

12. The apparatus according to claim 11, wherein the display brightness of the first partial image is greater than the display brightness of the second partial image.

13. The apparatus according to claim 10, further comprising:
an adjustment module configured to adjust gray scale voltages of pixel units to achieve the difference between the display brightness of the first partial image and the display brightness of the second partial image.

14. The apparatus according to claim 10, wherein the display module comprises a first pixel unit set and a second pixel unit set.

15. The apparatus according to claim 14, wherein the pixel units in the first pixel unit set and the pixel units in the second pixel unit set are arranged alternately in a transverse direction and/or a longitudinal direction.

16. A non-transient storage medium on which the computer program is stored, when called and executed by a processor, the computer program achieves a method for driving a three-dimensional (3D) display device, comprising:
determining a first 3D image to be displayed currently; and
displaying a first partial image of the first 3D image during a first period, and displaying a second partial image of the first 3D image during a second period, so as to display the first 3D image completely, wherein there is a difference between display brightness of the first partial image and display brightness of the second partial image,
wherein the first 3D image is a left-eye image or a right-eye image within a 3D image.

17. The non-transient storage medium according to claim 16, further comprising:
determining a first preset condition based on a display parameter for the first 3D image and a second 3D image that are displayed continuously, wherein in a case that the difference meets the first preset condition, a crosstalk index between the first 3D image and the second 3D image is smaller than a preset value.

18. The non-transient storage medium according to claim 17, wherein
the first 3D image is a left-eye image in a 3D image, and the second 3D image is a right-eye image in the 3D image; or
the first 3D image is a right-eye image in a 3D image, and the second 3D image is a left-eye image in the 3D image.

19. The non-transient storage medium according to claim 16, wherein the display brightness of the first partial image is substantially greater than the display brightness of the second partial image.

20. The non-transient storage medium according to claim 16, wherein a length of the first period and/or the second period is shorter than or equal to a length of one data frame display period.

* * * * *